(12) United States Patent
Münch

(10) Patent No.: US 11,305,815 B2
(45) Date of Patent: Apr. 19, 2022

(54) DISTURBANCE FEEDFORWARD CONTROL IN CASCADE REGULATION

(71) Applicant: ZF FRIEDRICHSHAFEN AG, Friedrichshafen (DE)

(72) Inventor: Eckehard Münch, Bünde (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 293 days.

(21) Appl. No.: 16/389,566

(22) Filed: Apr. 19, 2019

(65) Prior Publication Data

US 2019/0322313 A1    Oct. 24, 2019

(30) Foreign Application Priority Data

Apr. 20, 2018 (DE) ..................... 10 2018 206 089.4

(51) Int. Cl.
*B62D 6/00* (2006.01)
*B62D 6/08* (2006.01)
*B62D 15/02* (2006.01)

(52) U.S. Cl.
CPC .............. *B62D 6/003* (2013.01); *B62D 6/08* (2013.01); *B62D 15/025* (2013.01)

(58) Field of Classification Search
CPC ........ B62D 6/003; B62D 6/08; B62D 15/025; B62D 6/005; B62D 6/04; B62D 1/286;
(Continued)

(56) References Cited

U.S. PATENT DOCUMENTS

2009/0118905 A1\* 5/2009 Takenaka ............... B62D 6/003
                                                                701/41
2016/0176440 A1\* 6/2016 Witte .................... B62D 15/025
                                                                701/23
(Continued)

FOREIGN PATENT DOCUMENTS

DE        102014220865 A1     4/2016
DE        102014226781 A1     6/2016
WO     WO-2014115262 A1 \*   7/2014 ........... B62D 5/0457

OTHER PUBLICATIONS

Office Action for German Application No. 10 2018 206 089.4, dated Dec. 7, 2018.

*Primary Examiner* — Christian Chace
*Assistant Examiner* — Shayne M. Gilbertson
(74) *Attorney, Agent, or Firm* — Crowell & Moring LLP

(57) ABSTRACT

An evaluation device (10) for an interconnection of at least one first control circuit and one second control circuit for incorporating an interference signal (w), wherein the interconnection comprises at least one first controller (A) for regulating a first control variable (yA) on the basis of a first steering signal (sA) in the first control circuit, and at least one second controller (B) for regulating a second control variable (yB) on the basis of a second steering signal (sB) in the second control circuit, wherein the first steering signal (sA) of the first controller (A) comprises a second output signal (uB) of the second controller (B), comprising an input interface (11) for receiving an interference signal (2), wherein the evaluation device (10) is configured to determine at least one first model steering signal (wA) for the first controller (A) and a second model steering signal (wB) for the second controller (B) based on the interference signal (w), and at least one output interface (12) for incorporating the first model steering signal (wA) in the first steering signal (sA) and the second model steering signal (wB) in the (Continued)

second steering signal (sB) such that the first steering signal (sA) comprises a portion of the interference signal (w) and the second steering signal (sB) comprises a portion of the interference signal (w), in order to take into account the interference signal (w) as a steering signal when regulating a technological process.

17 Claims, 8 Drawing Sheets

(58) Field of Classification Search
CPC .......... B62D 6/002; G05B 2219/42091; G05D 1/0088
See application file for complete search history.

(56) References Cited

U.S. PATENT DOCUMENTS

| | | | |
|---|---|---|---|
| 2016/0280265 A1* | 9/2016 | Hass .................. | B62D 15/0265 |
| 2018/0086372 A1* | 3/2018 | Suda ...................... | B62D 6/002 |
| 2019/0054955 A1* | 2/2019 | Kalabic ................ | B62D 15/025 |

* cited by examiner

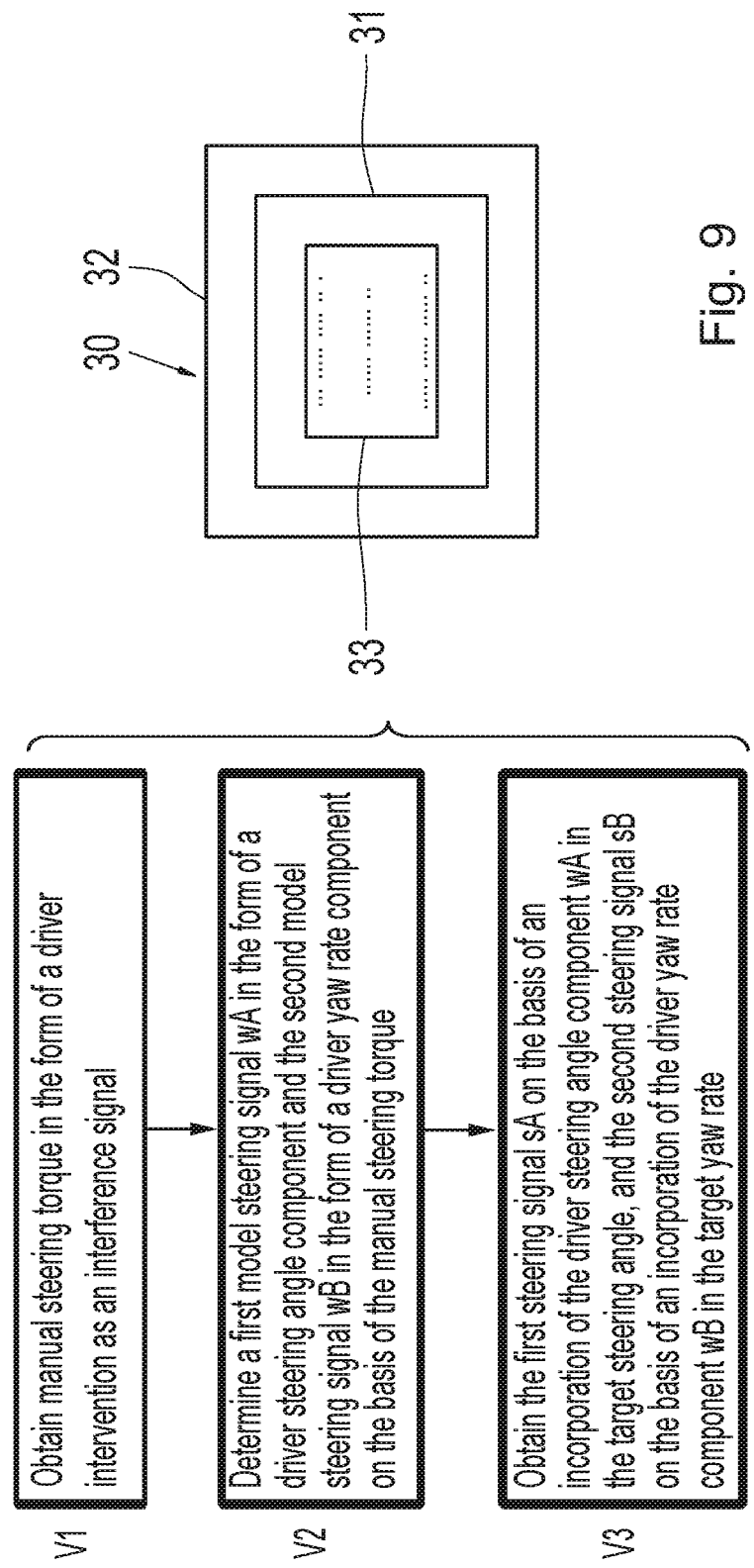

DISTURBANCE FEEDFORWARD CONTROL IN CASCADE REGULATION

RELATED APPLICATIONS

This application claims the benefit of priority under 35 U.S.C. § 119(a) of German Application No. 10 2018 206 089.4, filed Apr. 20, 2018, the content of which is incorporated herein by reference in its entirety.

Field

The invention relates to an evaluation device for interconnecting at least one first control circuit and a second control circuit for incorporating an interference signal according to claim 1. The invention also relates to an interconnection of numerous control circuits for incorporating an interference signal according to claim 5. Furthermore, the invention relates to a steering control system for a vehicle according to claim 8. Moreover, the invention relates to an autonomous vehicle according to claim 11. The invention also relates to a method for taking into account driver interventions in controlling movement of a vehicle according to claim 12, and a computer program for executing the method according to the invention, according to claim 15.

DESCRIPTION OF RELATED ART

Advanced driver assistance systems, abbreviated ADAS, steer a vehicle, etc., longitudinally and/or transversely. By way of example, an adaptive cruise control, abbreviated ACC, regulates the distance of a vehicle to a vehicle in front based on speed. A lane departure warning system, also known in English as a lane keeping assist, abbreviated LKA, warns a driver of the presence of another vehicle prior to changing lanes. Trajectory control systems steer a vehicle automatically, meaning that driver interventions, e.g. in the form of a steering torque applied manually via a steering wheel, are not provided for.

In conjunction with transverse control, torques are applied to the steering column via an actuator, e.g. via an electric motor. These torques rotate the steering column. The steering column is operatively connected to the wheels that are steered, e.g. the front wheels and/or the rear wheels. By way of example, the steering column is coupled to a steering rack via a mechanical coupling. The rack is coupled to the steered wheels. As a result, the torques turn the steered wheels. This turning of the wheels affects the driving direction of the vehicle.

The necessary steering torques are controlled in a steering control system or an ADAS in a first control circuit by a steering angle regulator. The steering angle that is to be obtained is regulated by a trajectory regulator in a second control circuit superimposed on the first control circuit, e.g. when controlling the trajectory.

One difficulty is represented by the problem of taking driver interventions into account during these control measures. Because the steering column is rigid, the driver acts directly on the steering column via a manual steering torque, thus affecting the steering of the wheels.

From a technological control oriented perspective, a driver intervention exhibits the properties of an interference. The superimposed controllers attempt to correct for these interferences, i.e. to compensate for them. The regulation adjusts the value of the control variable to the value of the steering signal, despite interfering effects. By way of example, the driver intervention results in a difference between the actual steering angle and the target steering angle. The steering angle control sends out an output signal for minimizing this control difference. The steering angle control then counteracts a driver's intention expressed by the driver intervention. The driver intervention, however, is not to be regarded as an interference, but instead as a steering signal. The driver's intention thus should not be compensated for, but instead should be accepted.

Conventional steering control systems function in an automated driving operation, i.e. without driver intervention, referred to in English as "hands-off," with a higher control circuit gain in the steering angle control. When a driver intervention is detected, the control circuit gain is immediately reduced. As a result, the driver's intention can be implemented. This also results in a limiting of the control performance. These controllers are formed without integrating components, abbreviated as I-components. Controllers with I-components are stationary precise controllers, which counteract driver interventions more strongly over time. Furthermore, a yaw rate controller is not used, or only used with limited gain and without I-components.

Furthermore, it is known for a controller of a control circuit to determine a resulting target value for controlling a steering device, wherein the resulting target value comprises a driver intervention. The prior art is disclosed, for example, in DE 10 2014 226 781 A1.

It is difficult, however, to take driver interventions into account in control circuits of a signaling cascade. With cascaded control structures, the inner control circuits must function more quickly than the outer control circuits. Because of the limited performance of the innermost control circuit, comprising a steering angle control for example, other cascades, e.g. underlying control circuits with steering speed controls, or overlying control circuits with yaw rate controls, can only be used to a limited extent.

SUMMARY

This is the basis for the invention. The fundamental object of the invention is to take a driver's intention into account in pronounced cascaded control structures and with the presence of integrating control components.

This object is achieved by an evaluation device for interconnecting at least one first control circuit and a second control circuit for incorporating an interference signal that has the features of claim 1. The object is also achieved by an interconnection of numerous control circuits for incorporating an interference signal that has the features of claim 5. The object is also achieved by a steering control system for a vehicle that has the features of claim 8. Moreover, the object is achieved by an autonomous vehicle that has the features of claim 11. The object is also achieved by a method for taking driver interventions into account when controlling the movement of a vehicle that has the features of claim 12, and by a computer program for executing the method according to the invention that has the features of claim 15.

Further developments and advantageous designs are given in the dependent claims.

The evaluation device according to the invention is intended for interconnecting at least one first control circuit to a second control circuit in order to incorporate an interference signal. The interconnection comprises at least one first controller. The first controller regulates a first control variable as a function of a first steering signal in the first control circuit. The interconnection also comprises at least one second controller. The second controller regulates a second control variable as a function of a second steering signal in the second control circuit. The first steering signal of the first controller comprises a second output signal of the second controller. The evaluation device comprises an input interface. The interference signal is received via the input interface. The evaluation device is configured to determine at least one first model steering signal for the first controller on the basis of the interference signal. Furthermore, the second evaluation device is configured to determine a second model steering signal for the second controller. Moreover, the evaluation device comprises at least one output interface. The first model steering signal is incorporated in the first steering signal and the second model steering signal is incorporated in the second steering signal via the output interface. The first steering signal resulting from this incorporation then comprises a portion of the interference signal. The second steering signal resulting from this incorporation also comprises a portion of the interference signal. As a result, the interference signal is taken into account as a steering signal when regulating a technological process.

Regulation is a process in which a variable that is to be regulated, the so called control variable, also referred to as the actual value, is continuously recorded. During this recording, the control variable is continuously compared to a steering signal, also referred to as the steering variable and/or the target value. The steering signal is a variable that is not directly affected by the relevant control supplied to the control circuit externally, and which is to follow an output signal of the control in a predefined dependence. The actual value deviates from the target value as a function of the interference signal, also referred to as an interference variable. Interference signals comprise all of the external variables that interfere with the intended effects in a control. Depending on the results of this comparison, the control variable is affected such that it harmonizes with the steering signal. The resulting effect takes place in a circuit, the so-called control circuit. The control variable acts on itself in a circuit structure in the manner of negative feedback.

A controller is a transfer element in a control device. The transfer element executes a mapping rule. The mapping rule, also referred to as a transfer function, assigns an output signal to each valid input signal for the corresponding transfer element. The input signal of the controller is the difference between the target value and the actual value, also referred to as the control difference. The control difference can be constant or variable over time. The output signal is a control signal, also referred to as a control variable. The control signal is the input variable in a control path. The control path is that part of the control circuit that represents the part of a system that is affected by the task. The output variable of the control path is the control variable that is returned to the controller as the input signal. Controllers affect physical variables in technological processes, e.g. temperature and/or amperage. Transfer elements comprise a P-link, i.e. a proportional transfer element, and I-link, i.e. an integrated transfer element, a D-link, i.e. a differential transfer element, and P-T link, i.e. a delay link. Controllers with P-, I-, D-, PI-, PP-, PD-, PID-, and PDD-components are obtained from corresponding series and/or parallel connections of these transfer elements. Controllers are obtained with circuits of diodes, capacitors, and microcontrollers.

The interconnection of controllers is also called a cascading of controllers, or referred to as a cascade control.

An evaluation device is a device that processes incoming information and outputs a result obtained from this processing. In particular, an electronic circuit, such as a central processing unit or a graphics processor, is an evaluation device.

An interface is a device between at least two functional units, at which an exchange of logical variables, e.g. data or physical variables, e.g. electrical signals, takes place, either unidirectionally or bidirectionally. The exchange can be analog or digital. The exchange can also be hard-wired or wireless.

A model steering signal is a steering signal that is determined on the basis of a model, i.e. a mapping rule or transfer function. The mapping rule or transfer function determines a model steering signal from an input value. The model describes how a target value changes in response to an interference signal.

The evaluation device according to the invention functions independently of the controllers that are used, in particular with high control circuit gains, as well as stationary precise controllers. With a stationary precise controller, the control difference approaches zero over time with stationary, i.e. constant, input values. The input values comprise steering signals and interference signals here. The technical problem of taking an interference signal into account as a steering signal in the control with a cascade control of a technological process is thus solved by the evaluation device according to the invention, in particular for a vehicle steering system.

The evaluation device is preferably configured to determine at least one first model value signal based on the interference signal. The first model value signal is incorporated in a first output signal of the first controller. The model value signal synthesizes a pilot control. A pilot control applies a value to a control variable, which is independent of the states of the control path and actual values resulting therefrom. The pilot control allows for the control variable demand expected on the basis of a target value curve to be taken into account. Because the pilot control is a control, it can improve the guidance behavior without endangering the stability. Analogously, it is also possible to incorporate measured interference values. This is referred to as an interference signal incorporation. As a result, the interference signal is taken into account as a pilot control signal in a cascade control in a technological process.

In a further development of the invention, the evaluation device interconnects numerous controllers. With the interconnection, a steering signal of a controller comprises an output signal of the respective next controller in the interconnection. The evaluation device is configured to determine a model steering signal for each controller. The respective model steering signal is incorporated in the steering signal of the respective controller. As a result, the evaluation device can also be used advantageously for a cascading of more than two controllers.

In a particularly preferred design of the invention, the evaluation device incorporates a manual steering torque by a driver of a vehicle in a regulation of a steering control system of the vehicle. The first controller is configured to regulate a target steering angle. The target steering angle is defined by the first steering signal. The second controller is configured to regulate a target yaw rate. The target yaw rate is defined by the second steering signal. The interference signal comprises the manual steering torque by the driver of the vehicle. The evaluation device is configured to determine the first model steering signal such that the first model steering signal comprises a driver steering angle component of the manual steering torque. Furthermore, the evaluation device is configured to determine the second model steering signal such that the model steering signal comprises a driver yaw rate component of the manual steering torque. In this manner, the manual steering torque is taken into account as a steering signal when regulating the steering control system.

The manual steering torque is normally applied via a steering wheel. A steering column, steering shaft, or a steering spindle is moved by the manual steering torque. The steering column, steering shaft, or steering spindle is mechanically coupled to steered front and/or rear wheels such that the manual steering torque applied to the steering wheel by the driver is converted to a change in the steering angle of the steered wheels. The steering angle or the change in the steering angle is affected by resistance torques. Resistance torques include, e.g., tire pressure, surface conditions, uneven weight distributions, and heavier loads to and deformations of individual wheels resulting therefrom, load changes when rounding a curve, or subjected to lateral winds, and/or when the vehicle speed is subjected to a transverse acceleration.

The steering angle is the angle formed by the longitudinal axis of the vehicle and the longitudinal direction of the tires. The steering angle is a function of the steering wheel angle, i.e. the angle over which the steering wheel is rotated, thus the steering angle of the steering wheel and the steering ratio.

The yaw rate is the turning speed of the vehicle about the vertical axis of the vehicle. The yaw rate is obtained from the steering angle, a vehicle speed, and the transverse acceleration.

The steering angle and yaw rate are synthesized, for example, with a linear single-track model. The linear single-track model synthesizes the transverse dynamics and/or longitudinal dynamics of dual-track motor vehicles. Both wheels on an axle are combined to form one wheel in a linear single-track model. The kinematics and the elastokinematics of the axle are only accounted for linearly. Furthermore, a linear tire behavior is also incorporated in the calculation.

In a vehicle steering system, a driver intervention by means of a manual steering torque is first regarded as an interference, in particular with automated vehicles in which a driver intervention in the steering is no longer provided for. The driver intervention is actually to be regarded as a steering variable, in particular when the driver wants to alter the driving direction.

In all of the embodiments of the evaluation device, it is preferred that at least one of the controllers is a stationary precision controller, preferably a controller with an integrating controller component. A controller with an integrating controller component acts on the control variable with a quantifier that is defined by a reset time. A reset time of, e.g., two seconds, means that at time $t=0$, the output signal of the controller reaches the value of a constant input signal after two seconds. In general, the reset time is a measure for how much the length of the control deviation affects the control. The behavior is often asymptotic, however. With an asymptotic behavior, the control difference first becomes zero when the temporal threshold value $t \to \infty$ is reached. In practice, it is normally sufficient when the control difference falls below a specific threshold, e.g. the measurement precision or the signal/noise ratio. An integrating controller element results in a precise, but slow regulation.

The interconnection of numerous control circuits according to the invention enables the incorporation of an interference signal. The interconnection comprises numerous controllers. With the interconnection, a steering signal of a controller comprises an output signal of the respective next controller in the interconnection. The interconnection comprises at least one first controller. The first controller regulates a first control variable as a function of a first steering signal in a first control circuit. Furthermore, the interconnection comprises at least one second controller. The second controller regulates a second control variable as a function of a second steering signal in the second control circuit. The first steering signal of the first controller comprises a second output signal of the second controller. Furthermore, the interconnection comprises an evaluation device according to the invention. As a result, the interference signal is taken into account in the interconnection as a steering signal when regulating a technological process. The invention thus provides not only an evaluation device, but also an interconnection of numerous control circuits.

The interconnection is preferably provided for controlling a movement of a vehicle. The first controller is configured to regulate a target steering angle. The target steering angle is defined by the first steering signal. The second controller is configured to regulate a target yaw rate. The target yaw rate is defined by the second steering signal. The interference signal comprises a manual steering torque from a driver of the vehicle. The first model steering signal comprises a driver steering angle component of the manual steering torque. The second model steering signal comprises a driver yaw rate component of the manual steering torque.

By way of example, the control path for a vehicle steering system comprises a steering actuator, the steering column, and the vehicle, e.g. in the form of a vehicle control device. The steering angle is regulated in the first control circuit, which is the innermost control circuit in the interconnection. The first controller is a steering angle controller. The first output signal of the first controller is an electric phase current for an electric motor, for example. The electric motor drives the steering actuator. The electric motor is supplied with power from a vehicle electrical system of the vehicle. The manual steering torque is applied to the steering column. The yaw rate is regulated in the second control circuit, which is an outer control circuit in the interconnection. The second controller is a yaw rate controller. The second output signal of the second controller is an electrical voltage, for example, which represents a first steering signal for the target steering angle. Alternatively, the second output signal is a digital signal.

With such an interconnection, the driver intervention can be taken into account in the control circuits of the control cascade as a component of the respective steering variable. This takes place through a reverse calculation, based on the target values, of the driver's effect on the respective inputs of the individual controllers.

The first model value signal in the interconnection is preferably a supporting steering torque. A supporting steering torque is a pilot control for the steering actuator. The steering force is applied by both the muscle strength of the driver and by a further energy source in the form of a steering torque support. A steering system with steering torque support is also referred to as an auxiliary force steering system. One example of an auxiliary force steering system is an electric auxiliary force steering system. According to the invention, a supporting steering torque is modeled to also pre-control the steering system without a concrete existing pilot control device.

The steering control system according to the invention for a vehicle comprises a first sensor. A manual steering torque by a driver of the vehicle is detected by the first sensor as an interference signal. The steering control system also comprises a first controller. A first output signal for regulating a difference between a first control variable in the form of an actual steering angle and a target steering angle is obtained with the first controller. The target steering angle is defined by a first steering signal of the first controller. The steering control system also comprises a second sensor. The first control variable is obtained with the second sensor. The steering control system also comprises a second controller. A second output signal for regulating a difference between a second control variable, in the form of an actual yaw rate, and a target yaw rate is obtained with the second controller. The target yaw rate is defined by a second steering signal of the second controller. The first steering signal comprises the second output signal. The steering control system also comprises a third sensor. The second control variable is obtained with the third sensor. The steering control system also comprises an evaluation device according to the invention. The first model steering signal comprises a driver steering angle component of the manual steering torque. As a result, the manual steering torque is taken into account as a steering signal during a steering control.

The first sensor is a steering torque sensor, by way of example. The steering torque sensor is an optical sensor, for example, which detects rotations, e.g., by means of interacting light-emitting diodes and photodiodes. Alternatively, the steering torque sensor is a Hall effect sensor. The steering torque sensor is preferably integrated in the steering system. The first controller is a steering angle controller for regulating a steering angle. The first input signal of the first controller comprises not only the target steering angle and the driver steering angle component, but also the first control variable, which is an actual steering angle. The actual steering angle is detected with the second sensor in the form of a steering angle sensor, and returned to an input of the first controller. The steering angle sensor is a Hall effect sensor, for example. The second controller is a yaw rate controller for regulating the yaw rate. The second input signal of the second controller comprises not only the target yaw rate and the driver yaw rate component, but also the second control variable, with is an actual yaw rate. The actual yaw rate is detected by the third sensor in the form of a yaw rate sensor, e.g. a hollow cylinder on which numerous piezoelectric elements are located. A portion of these elements cause the hollow cylinder to vibrate. The other portion of these elements measures whether the nodes change at the points where these elements are located. A yaw movement of the vehicle alters the nodes of the hollow cylinder.

The steering control system preferably comprises at least one driver assistance system. The driver assistance system is configured to determine the target yaw rate based on movement information obtained with at least one environment detection sensor of the driver assistance system.

Driver assistance systems are systems that assist a driver in driving, and also enable all of the driver's duties to be assumed by the automated system. A driver assistance system normally carries out the following effect chain: recording an environment with at least one environment detection sensor, processing the recording in order to obtain a global scenario of the environment, and deriving and executing vehicle control commands in order to react appropriately to the environment, e.g. with artificial intelligence.

The environment detection sensor is, e.g., a radar sensor, lidar sensor, imaging sensor, audio sensor, position sensor, or acceleration sensor. Alternatively, the driver assistance system comprises numerous environment detection sensors, in order to merge the signals of the individual environment detection sensors. An improved image of the environment is obtained by sensor merging.

The driver assistance system is preferably configured to obtain at least the driver steering angle component and the driver yaw rate component. The driver assistance system is also configured to output these obtained driver components in the form of vehicle control device control signals.

Advantageously, the driver assistance system is configured to calculate a curvature of the roadway or a transverse deviation of the roadway based on the driver components. Alternatively, the driver assistance system is deactivated on the basis of the driver components. The driver assistance system preferably assumes, or is trained to assume, a specific behavior based on the driver components. If the driver assistance system is a means for remaining in a lane, for example, which guides the vehicle in the middle of a driving lane, the driver components are used in order to inform the lane keeping assistant that the vehicle should move toward the left side of the lane, into the middle, or toward the right side of the lane.

The invention also relates to an autonomous vehicle comprising a steering control system according to the invention.

An autonomous vehicle is a vehicle that has a technological apparatus for handling a driving task with a vehicle control device, including longitudinal and transverse guidance, which can control the respective vehicle after activating such an automated driving function, in particular a highly or fully automated driving function according to the standard SAEJ3016.

A semi-autonomous vehicle can assume certain driving tasks. The SAEJ3016 standard distinguishes between SAE level 2 and SAE level 3. Level 2 is defined in that the driving mode-specific execution of steering and acceleration/braking procedures is carried out by one or more driver assistance systems using information regarding the driving environment with the expectation that the human driver executes all of the remaining aspects of the dynamic driving tasks. Level 3 is defined in that the driving mode-specific execution of all aspects of the dynamic driving tasks is carried out by an automated driving system with the expectation that the human driver will react appropriately to requests by the system.

A fully automated vehicle replaces the driver. The SAEJ3016 standard distinguishes between SAE level 4 and SAE level 5. Level 4 is defined in that the driving mode-specific execution of all aspects of the dynamic driving tasks is carried out by an automated driving system, even when the human driver does not react appropriately to a request by the system. Level 5 is defined in that the consistent execution of all aspects of the dynamic driving tasks is carried out by an automated driving system in all driving and environmental conditions that could be handled by a human driver.

A purely assistance system assists the driver in executing a driving task. This corresponds to SAE level 1.

An autonomous vehicle with a steering control system according to the invention also takes a driver intervention into account in an automated driving mode, without reducing the control performance.

Driver interventions are taken into account in regulating a movement of a vehicle with the method according to the invention. Numerous control circuits are interconnected for the regulation, such that a steering signal of a controller comprises an output signal of the next controller in the interconnection. The method comprises the following steps: a manual steering torque in the form of a driver intervention is obtained in a first step. At least one driver steering angle component and a driver yaw rate component are determined on the basis of the manual steering torque in a second step. At least one first steering signal for a first controller is obtained in a third step, based on an incorporation of the driver steering angle component of obtain a target steering angle. Furthermore, a second steering signal for a second controller is obtained on the basis of an incorporation of the driver yaw rate component of obtain a target yaw rate. The manual steering torque is taken into account as a steering signal when regulating the movement of the vehicle. As a result, the invention also provides a method for taking the driver's interventions into account when regulating movement of a vehicle.

The target yaw rate is preferably obtained on the basis of movement information obtained from at least one environment detection sensor of at least one driver assistance system.

An evaluation device according to the invention or a steering control system according to the invention are used particularly preferably for executing the method.

The computer program according to the invention takes driver interventions into account when regulating a movement of a vehicle. The computer program is designed to be uploaded to a computer memory. The computer program comprises software segments with which the steps of the method according to the invention are executed when the computer program runs on the computer.

A computer is a device for processing data, which can process data by means of programmable computing rules. An evaluation device can be a computer.

Software is a general term for programs and associated data. The complement to software is hardware. Hardware refers to the mechanical and electronic assembly of a data processing system.

Computer programs normally comprise a series of commands, by means of which the hardware executes a specific process when the program is uploaded, by which a specific result is obtained. When the relevant program is used on a computer, the computer program causes a technical effect, specifically the taking into account of driver interventions when regulating movement of a vehicle.

A memory is a medium for storing data.

The computer program according to the invention is platform-independent. This means that it can be executed on any computer platform. The computer program is preferably executed on an evaluation device according to the invention.

The invention is not limited to a regulation of a vehicle steering system, and thus the transverse dynamics. There is also an analogous regulation of the longitudinal dynamics in the framework of the invention. The longitudinal guidance is normally affected by the gas pedal and brake system. The gas pedal is normally an x-by-wire system. The term x-by-wire refers to the replacement of mechanical connections, signals and systems for manual control with the conducting of electrical, electronic, optoelectronic or optical control signals between the operating elements and the actuators. A driver intervention in the form of an actuation of the gas pedal can then be treated directly as an input signal of a controller. The braking system normally comprises a hydraulic actuation applied to the braking torque.

BRIEF DESCRIPTION OF THE DRAWINGS

The invention shall be explained by way of example based on the following figures. Therein:

FIG. 8 shows a schematic illustration of a method according to the invention; and FIG. 9 shows an exemplary embodiment of a computer program.

DETAILED DESCRIPTION

Identical reference symbols indicate identical objects or objects with the same function in the figures. Only the relevant objects are indicated with reference symbols in the figures, in order to avoid repetition.

Figure 1:
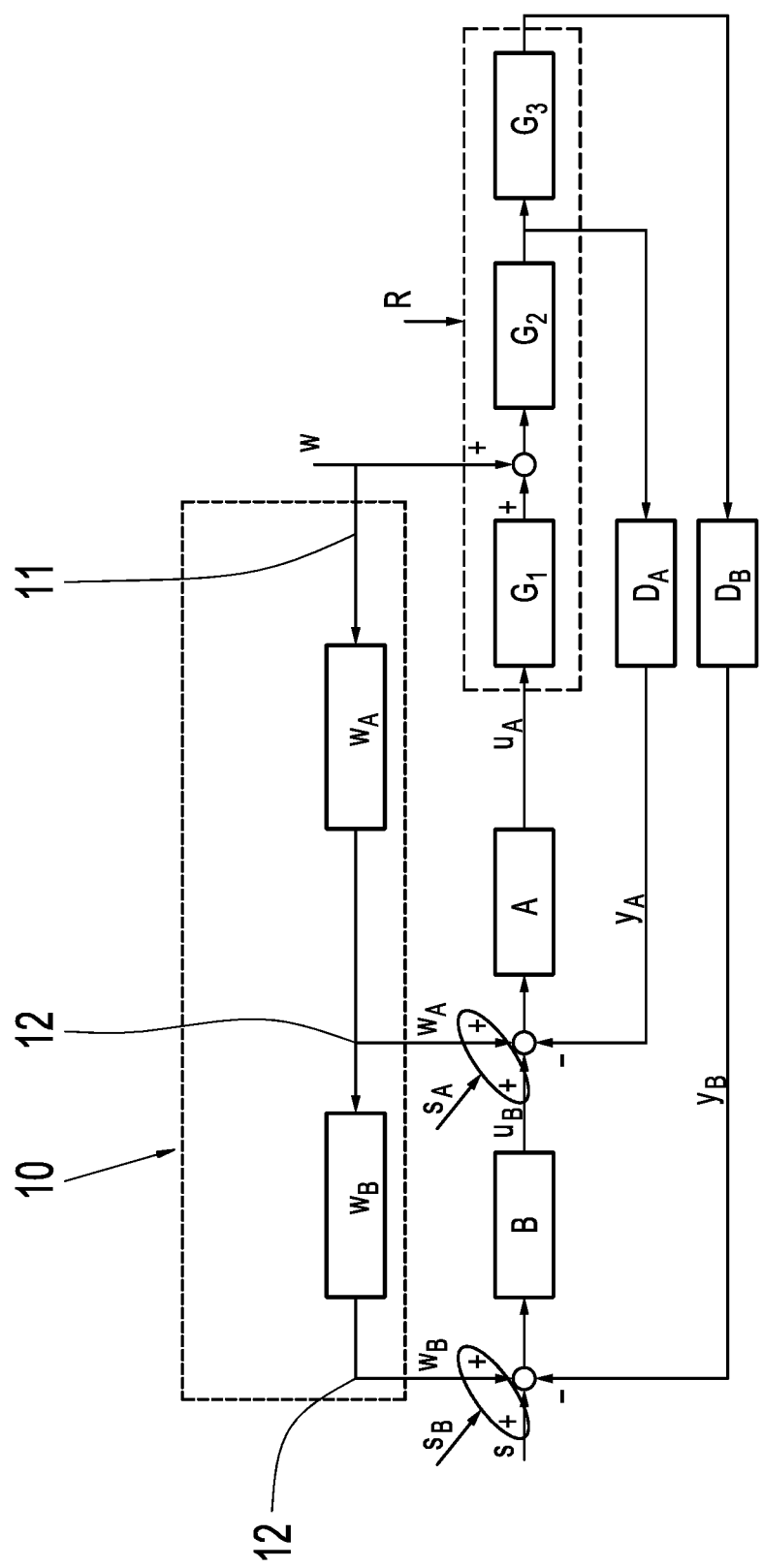
FIG. 1 shows an exemplary embodiment of an evaluation device according to the invention, in a control cascade comprising two control circuits.

FIG. 1 shows an evaluation device 10 in a cascade control. The cascade control comprises an inner first controller A and an outer second controller B. The first controller A and the second controller B regulate a control path R. The control path R comprises three components. The components are modeled as a first transfer function G1, a second transfer function G2, and a third transfer function G3. A transfer function G normally models the behavior of linear control circuit elements. The transfer function is obtained, for example, through the Laplace transformation or the z-transformation of the linear differential equations describing the system. The transfer function describes the input and output behaviors of a linear, time-invariant transfer system. In the example of a steering control system 20, the first component of the control path R is a steering actuator LA. The second component of the control path R is a steering column LS. The third component of the control path R is a vehicle 1 (cf. FIG. 4). An interference signal w has an effect on the control path R. In the case of the steering control system 20, the interference signal 2 is a manual steering torque.

The evaluation device 10 receives the interference signal w via an input interface 11. The evaluation device 10 determines a first model steering signal wA based on the interference signal w. In the case of the steering control system 20, the first model steering signal wA is a driver steering angle component. The evaluation device 10 is configured to calculate the first model steering signal wA as a function of the interference signal w and at least one of the transfer functions G1, G2 and/or G3. Analogously, the evaluation device 10 determines a second model steering signal wB. In the case of a vehicle steering system, the second model steering signal wB is a driver yaw rate component.

The first model steering signal wA is incorporated in a second output signal uB of the second controller B via an output interface 12 of the evaluation device 10. The incorporation can be an addition or a subtraction. The second output signal uB and the incorporated first model steering signal wA collectively form the first steering signal sA for the first controller A.

In addition to the first steering signal sA, the first controller A receives a first control variable yA as an input. In the case of the steering control system 20, the first control variable yA is the actual steering angle. The first control variable yA is measured in the control path R with a second sensor DA downstream of the second component. In the case of the steering control system 20, the second sensor DA is a steering angle sensor. A inner first control circuit is formed by the first controller A, the relevant components of the control path R, and the second sensor DA.

The second model steering signal wB is incorporated in a steering signal s for the control path R via the output interface 12. The incorporation can likewise be an addition or a subtraction. The steering signal s and the incorporated second model steering signal wB collectively form the second steering signal sB for the second controller B.

In addition to the second steering signal sB, the second controller B receives a second control variable yB as an input. In the case of the steering control system 20, the second control variable yB is the actual yaw rate. The second control variable yB is measured in the control path R with a third sensor DB downstream of the third component. In the case of the steering control system 20, the third sensor DB is a yaw rate sensor. An outer second control circuit is formed by the second controller B, the relevant components of the control path R, and the third sensor DB. The first control circuit is located inside the second control circuit.

The evaluation device 10 has separate output interfaces 12 for outputting the first model steering signal wA, the second model steering signal wB and all other model steering signals. Alternatively, there is just one output interface 12 for all of the model steering signals.

The control path R is activated at the controller end with a first output signal uA.

Figure 2:
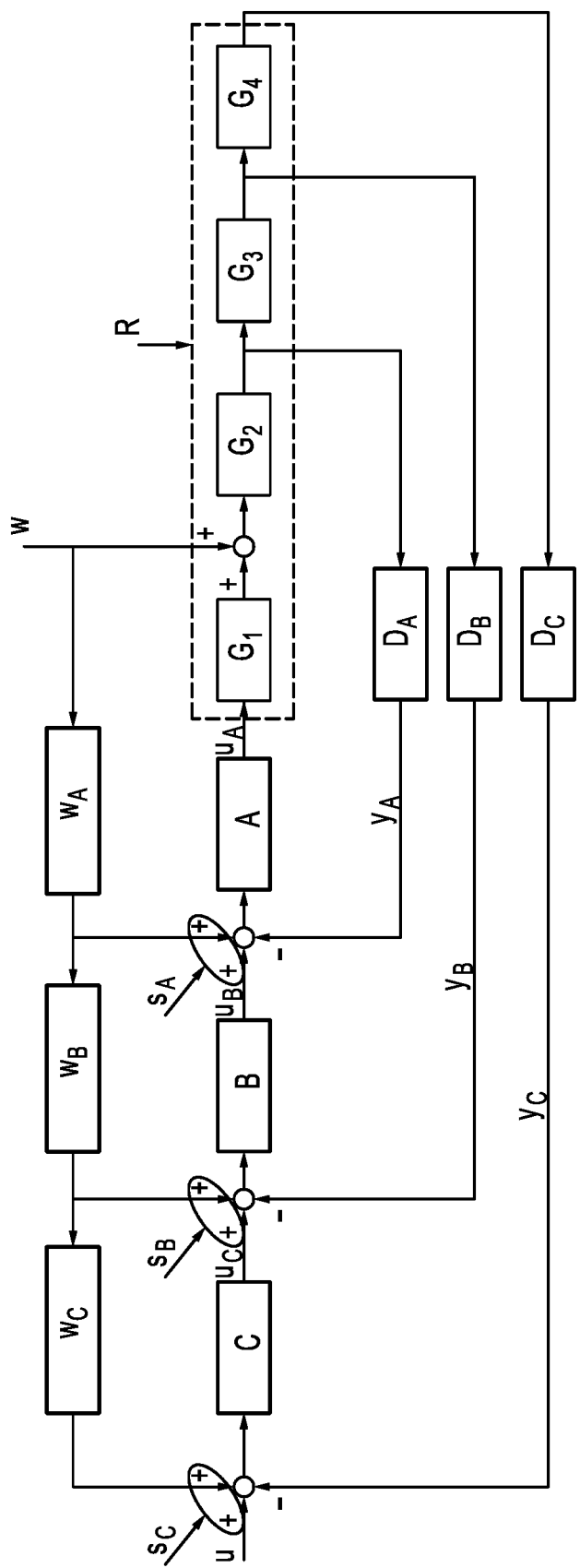
FIG. 2 shows an exemplary embodiment of an evaluation device according to the invention in a control cascade comprising three control circuits.

FIG. 2 is an expansion on FIG. 1 with a third controller C. The control path R comprises a fourth transfer function G4.

The evaluation device 10 determines a third model steering signal wC based on the interference signal w. In the case of the steering control system 20, the third model steering signal wC is a driver driving direction component of the manual steering torque. The driving direction is obtained from the angle of deviation. The angle of deviation is the angle between a velocity vector at the center of gravity of the vehicle 1 and a longitudinal axis of the vehicle. The evaluation device 10 is configured to calculate the third model steering signal wC based on the interference signal w and at least one of the transfer functions G1, G2, G3 and/or G4.

The second model steering signal wB is incorporated in a third output signal uC of the third controller C via the output interface 12. The incorporation can be an addition or a subtraction. The third output signal uC and the incorporated second model steering signal wB collectively form the second steering signal sB for the second controller B.

The third model steering signal wC is incorporated in a steering signal s for the control path R via the output interface 12. The incorporation can likewise be an addition or a subtraction. The steering signal s and the incorporated third model steering signal wC collectively form the third steering signal sC for the third controller C.

In addition to the third steering signal sC, the third controller C receives a third control variable yC as an input. In the case of the steering control system 20, the third control variable yC comprises the actual driving direction. The third control variable yC is measured with a fourth sensor DC in the control path R downstream of the third component. In the case of a vehicle movement, the fourth sensor DC is a position sensor, preferably a GPS sensor. The position is alternatively obtained via position data from a camera or from a data fusion of position detecting sensors. The third controller C, the relevant components of the control path R, and the fourth sensor DC form an outer third control circuit. The second control circuit is inside the third control circuit.

Figure 3:
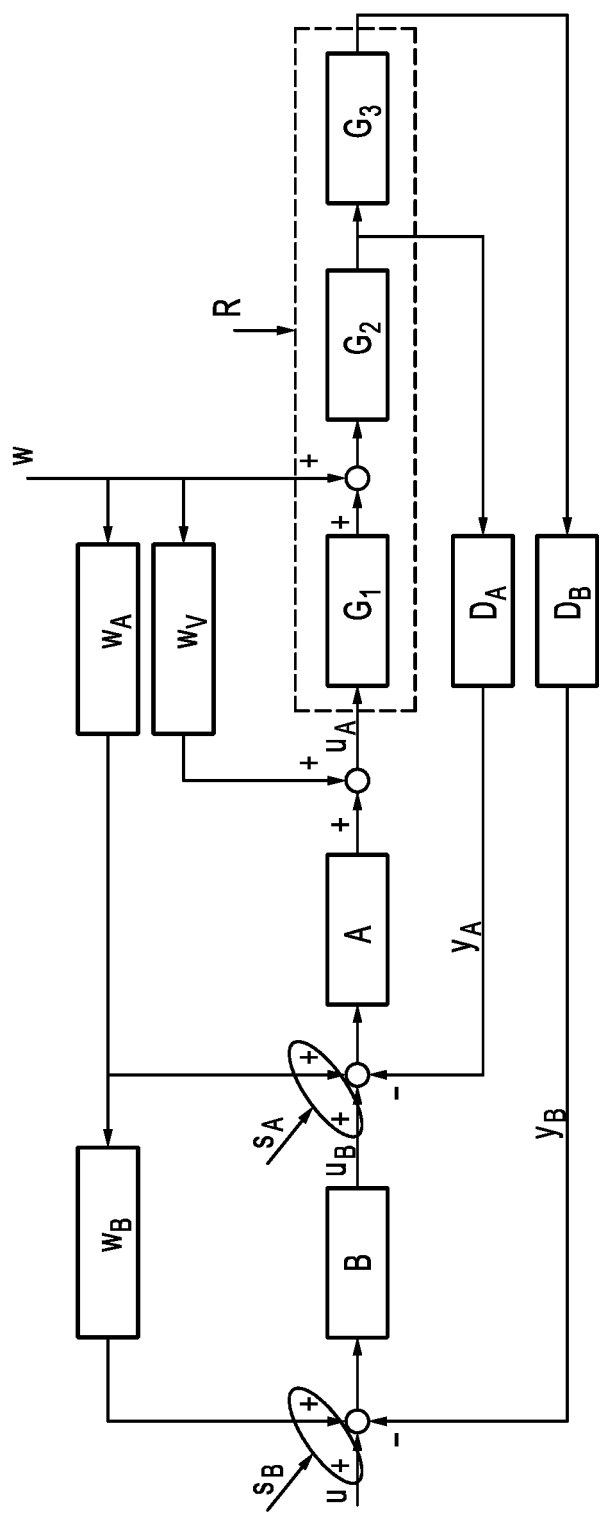
FIG. 3 shows an exemplary embodiment of an evaluation device according to the invention in a control cascade comprising two control circuits and a pilot control element.

FIG. 3 differs from FIG. 1 in that it contains an additional model value signal wV. The evaluation device 10 determines the model value signal wV based on the interference signal w. The model value signal wV is, e.g., a function of the transfer functions G1, G2, and/or G3. In the case of a steering torque support, alternatively, engine characteristic maps can be used. The model value signal wV is incorporated in the first output signal uA of the first controller A, and synthesizes a pilot control. In the case of the steering control system 20, the model value signal wV synthesizes a steering torque support.

Figure 4:
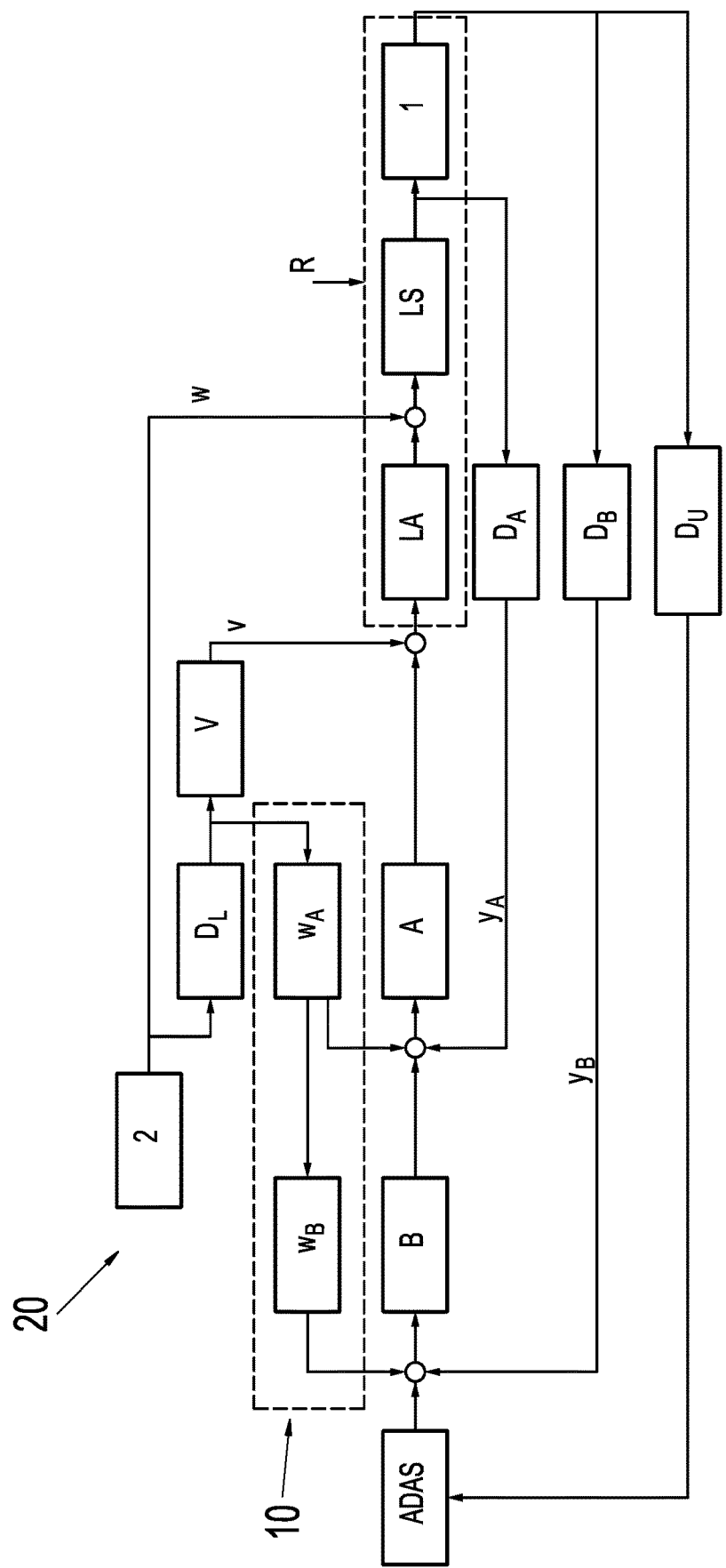
FIG. 4 shows an exemplary embodiment of a steering control system according to the invention that has an evaluation device according to FIG. 1.

FIG. 4 shows the steering control system 20. A driver 2 of the vehicle 1 exerts a manual steering torque as an interference signal w. The manual steering torque is detected by a first sensor DL. The first sensor DL is a steering torque sensor. The detected manual steering torque is also processed by a pilot control V for supporting a steering torque. The pilot control outputs a supporting torque v to the first output signal uA of the first controller A.

The steering control system 20 comprises a driver assistance system ADAS. The driver assistance system receives data from an environment detection sensor DU. The environment detection sensor DU is a camera, for example. The driver assistance system determines the steering signal s for the control path R based on this data.

Figure 5:
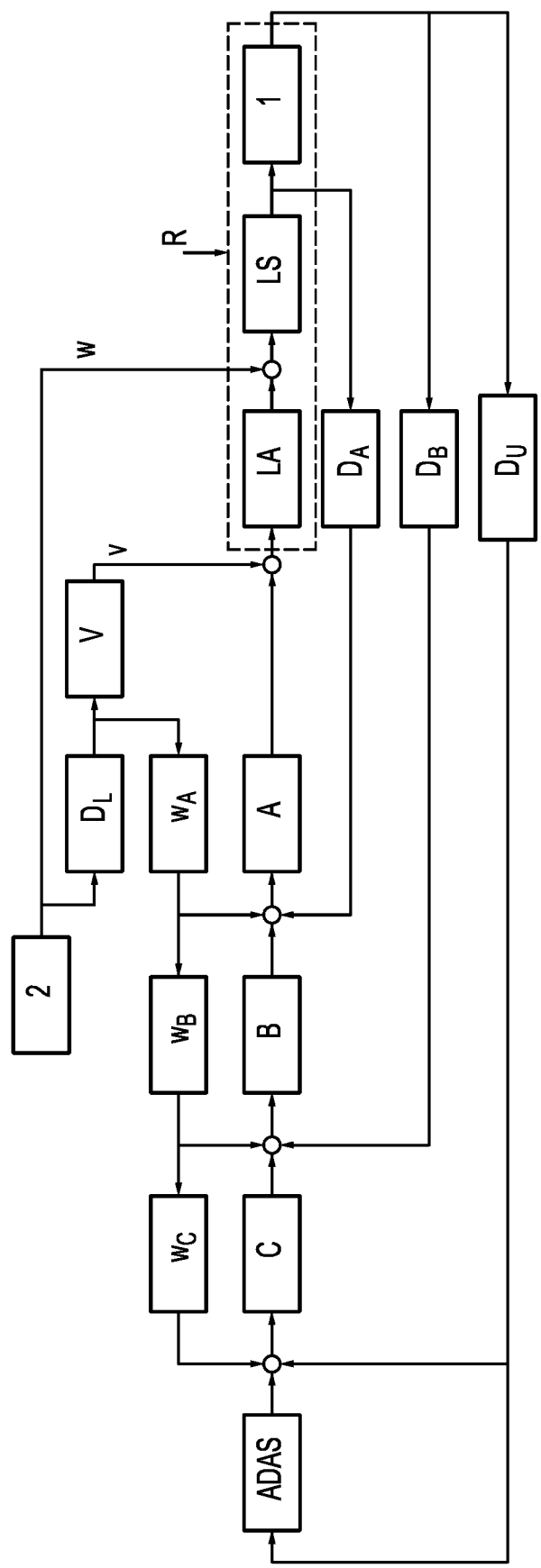
FIG. 5 shows an exemplary embodiment of a steering control system according to the invention that has an evaluation device according to FIG. 2.

FIG. 5 is an expansion of FIG. 4 with the third controller C, analogous to FIG. 2.

Figure 6:
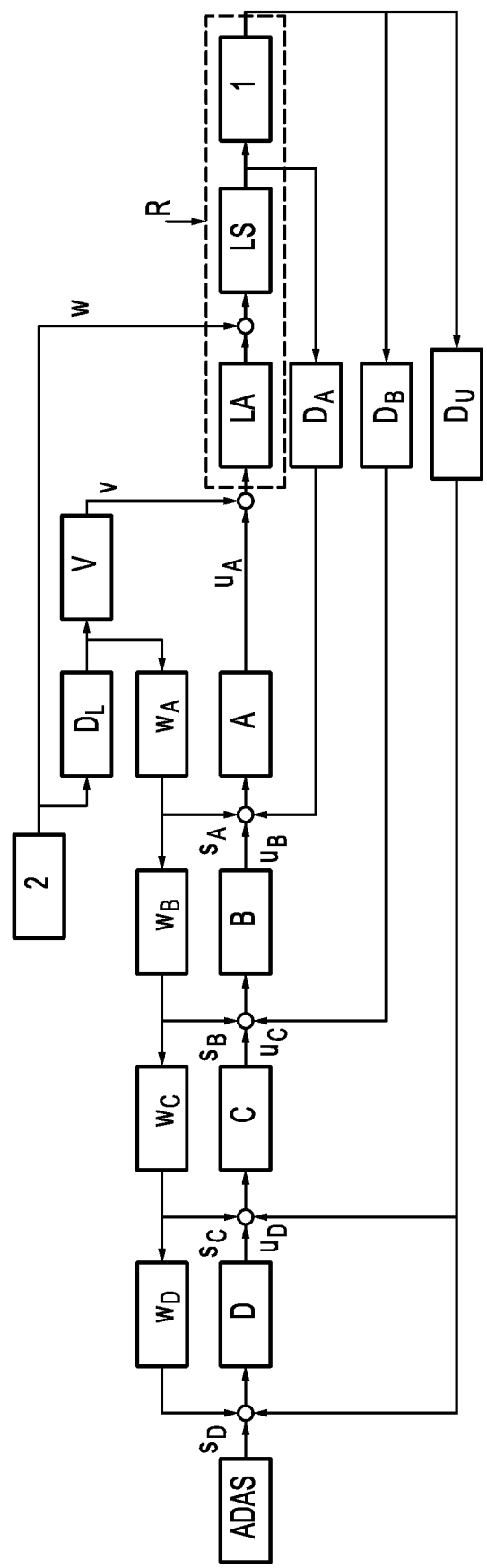
FIG. 6 shows an exemplary embodiment of a steering control system according to the invention that has an exemplary embodiment of an evaluation device according to the invention in a control cascade comprising four control circuits.

FIG. 6 is an expansion of FIG. 5 with a fourth controller D. The evaluation device 10 determines a fourth model steering signal wD based on the interference signal w. In the case of the vehicle movement, the fourth model steering signal wD is a driver position component of the manual steering torque. The position is obtained by integrating the vehicle velocity or the driving direction over time, taking transverse dynamics into account. The evaluation device 10 is configured to calculate the fourth model steering signal wD based on the interference signal w and at least one of the transfer functions G1, G2, G3.

The third model steering signal wC is incorporated in a fourth output signal uD of the fourth controller D via the output interface 12. The incorporation can be an addition or a subtraction. The fourth output signal uD and the incorporated third model steering signal wC collectively form the third steering signal sC for the third controller C.

The fourth model steering signal wD is incorporated in a steering signal s for the control path R via the output interface 12. The incorporation can likewise be an addition or a subtraction. The steering signal s and the incorporated fourth model steering signal wD collectively form the fourth steering signal sD for the fourth controller D.

In addition to the third steering signal sC, the third controller C also receives a third control variable yC as an input. In the case of the steering control system 20, the third control variable yC comprises the actual driving direction. The third control variable yC is measured with a fourth sensor DC in the control path downstream of the third component. In the case of a vehicle movement, the fourth sensor DC is a position sensor, preferably a GPS sensor. An outer third control circuit is formed by the third controller C, the relevant components of the control path R, and the fourth sensor DC. The second control circuit is located inside the third control circuit.

Figure 7:
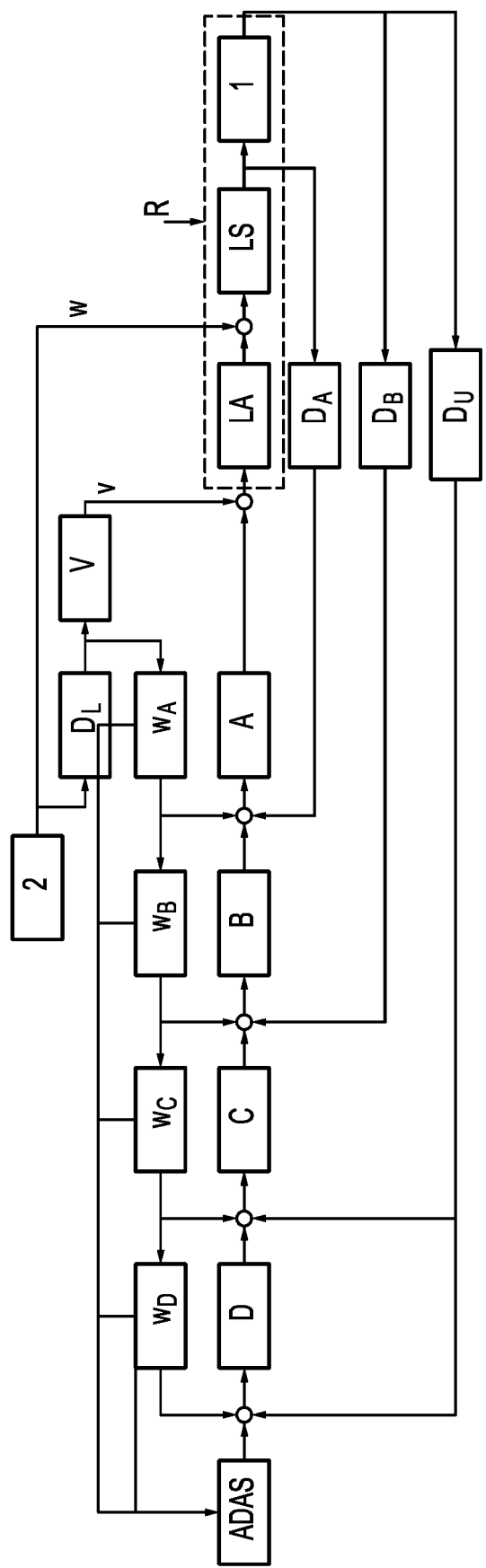
FIG. 7 shows an exemplary embodiment of a steering control system according to FIG. 6 that uses model steering variables in a driver assistance system.

FIG. 7 differs from FIG. 6 in that the first model steering signal wA, the second model steering signal wB, the third model steering signal wC, and the fourth model steering signal wD are also supplied to the driver assistance system ADAS. As a result, the driver assistance system ADAS can make use of further information, in addition to the data from the environment detection sensor DU.

FIG. 8 illustrates the method according to the invention. In a first step V1, the manual steering torque in the form of a driver intervention is obtained as an interference signal. In a second step V2, at least one first model steering signal wA in the form of a driver steering angle component and the second model steering signal wB in the form of a driver yaw rate component are each determined on the basis of the manual steering torque. In a third step, at least the first steering signal sA for the first controller A is obtained on the basis of an incorporation of the driver steering angle component wA in the target steering angle, and the second steering signal sB for the second controller B is obtained on the basis of an incorporation of the driver yaw rate component wB in the target yaw rate.

The steps V1, V2 and V3 are preferably programmed as software code segments 33, and executed in a memory 31 of a computer 32 as a computer program (cf. FIG. 9).

REFERENCE SYMBOLS 1 vehicle
2 driver
DL first sensor
V pilot control steering torque support
v support torque
LA steering actuator
LS steering column
10 evaluation device
11 input interface
12 output interface
20 steering control system
s steering signal control path
w interference signal
R control path
G1 first transfer function
G2 second transfer function
G3 third transfer function
G4 fourth transfer function
A first controller
B second controller
C third controller
D fourth controller
sA first steering signal
sB second steering signal
sC third steering signal
sD fourth steering signal
wA first model steering signal
wB second model steering signal
wC third model steering signal
wD fourth model steering signal
wV model value signal
uA first output signal
uB second output signal
uC third output signal
uD fourth output signal
yA first control variable
yB second control variable
yC third control variable
yD fourth control variable
DA second sensor
DB third sensor
DC fourth sensor
DU environment detection sensor
ADAS driver assistance system
V1-V3 steps of the method
30 computer program
31 memory
32 computer
33 software code segment

The invention claimed is:

1. An evaluation device configured to:
communicate with a first control circuit and a second control circuit,
wherein the first control circuit comprises at least one first controller configured to receive a first input signal comprising a first steering signal as an input and to regulate a first control variable on the basis of the first steering signal, and
wherein the second control circuit comprises at least one second controller configured to receive a second input signal comprising a second steering signal as an input and to regulate a second control variable on the basis of the second steering signal, and
wherein the first steering signal comprises a second output signal of the second controller,
wherein the evaluation device comprises:
at least one input interface configured to receive an interference signal;
at least one processor configured to:
determine, on the basis of the interference signal, at least one first model steering signal for the first controller, and
determine, on the basis of the interference signal, at least one second model steering signal for the second controller,
and
at least one output interface configured to output the at least one first model steering signal and the at least one second model steering signal, wherein the first model steering signal is incorporated with the second output signal of the second controller in the first steering signal as part of the first input signal input into the first controller, and
the second model steering signal is incorporated in the second steering signal as part of the second input signal input into the second controller,
such that the first steering signal comprises a portion of the interference signal and the second steering signal comprises a portion of the interference signal, in order to take the interference signal into account as a steering signal when regulating a technological process.

2. The evaluation device according to claim 1, wherein the at least one processor of the evaluation device is configured to:
determine at least one model value signal based on the interference signal; and
output the at least one model value signal via the at least one output interface, wherein the first model value signal is incorporated with a first output signal of the first controller.

3. The evaluation device according to claim 1, wherein the evaluation unit is further configured to communicate with at least a third control circuit comprising at least a third controller configured to receive a third input signal comprising a third steering signal as an input and to regulate a third control variable on the basis of the third steering signal, and wherein the second steering signal comprises a third output signal of the third controller, and wherein the at least one processor of the evaluation device is configured to:

determine, on the basis of the interference signal, at least one third model steering signal for the third controller; and output the at least one third model steering signal via the at least one output interface, wherein the at least one third model steering signal is incorporated in the third steering signal input into the third controller.

4. The evaluation device according to claim 1 for incorporating a manual steering torque of a driver of a vehicle to regulate a steering control system of the vehicle, wherein the first controller is configured to regulate a target steering angle, wherein the target steering angle is defined by the first steering signal, the second controller is configured to regulate a target yaw rate, wherein the target yaw rate is defined by the second steering signal, and the interference signal comprises the manual steering torque of the driver of the vehicle, wherein the evaluation device is configured to determine the first model steering signal such that the first model steering signal comprises a driver steering angle portion of the manual steering torque, and to determine the second model steering signal such that the second model steering signal comprises a driver yaw rate portion of the manual steering torque, in order to take into account the manual steering torque in the regulation of the steering control system as a steering signal.

5. The interconnection according to claim 2, wherein the first model value signal is a supporting steering torque.

6. A steering control system for a vehicle, comprising:

the evaluation device according to claim 1;

a first sensor configured to obtain a manual steering torque of a driver of the vehicle as the interference signal;

the first controller configured to receive the first input signal comprising a difference between the first control variable and a target steering angle, wherein the target steering angle is defined by the first steering signal of the first controller, wherein the first control variable is an actual steering angle, and wherein the first controller is configured to regulate the difference between the first control variable and the target steering angle;

a second sensor for obtaining the first control variable;

the second controller configured to receive the second input signal comprising a difference between the second control variable and a target yaw rate, wherein the target yaw rate is defined by the second steering signal, and wherein the second control variable is an actual yaw rate, and wherein the second controller is configured to regulate the difference between the second control variable and the target yaw rate; and a third sensor for obtaining the second control variable, wherein the first model steering signal comprises a driver steering angle component of the manual steering torque, and the second model steering signal comprises a driver yaw rate component of the manual steering torque, in order to take the manual steering torque into account as a steering signal when regulating the steering.

7. The steering control system according to claim 6, wherein the steering control system further comprises at least one driver assistance system, wherein the driver assistance system is configured to determine the target yaw rate based on movement data obtained from at least one environment detection sensor of the driver assistance system.

8. The steering control system according to claim 7, wherein the driver assistance system is configured to:

obtain at least the driver steering angle component and the driver yaw rate component; and output these obtained driver components in the form of control signals of a vehicle control device.

9. An autonomous vehicle comprising the steering control system according to claim 6.

10. A method for taking driver interventions into account when regulating a movement of a vehicle, the method comprising:

obtaining a manual steering torque in the form of a driver intervention;

determining a driver steering angle component on the basis of the manual steering torque;

determining a driver yaw rate component on the basis of the manual steering torque;

incorporating the driver yaw rate component into a second steering signal and inputting a second input signal that comprises the second steering signal into a second controller, wherein the second steering signal comprises a target yaw rate;

outputting a second output signal from the second controller based on the first input signal;

incorporating the driver steering angle component and the second output signal into a first steering signal and inputting a first input signal that comprises the first steering signal into a first controller, wherein the first steering signal comprises a target steering angle; and outputting a first output signal used for control of a steering system from the first controller based on the first input signal.

11. The method according to claim 10, further comprising obtaining the target yaw rate on the basis of movement data obtained with at least one environment detection sensor of at least one driver assistance system.

12. A non-transitory computer readable medium having instructions stored thereon that, when executed by at least one computer, cause the at least one computer to execute a method comprising:

obtaining a manual steering torque in the form of a driver intervention;

determining a driver steering angle component on the basis of the manual steering torque;

determining a driver yaw rate component on the basis of the manual steering torque;

incorporating the driver yaw rate component into a second steering signal and inputting a second input signal that comprises the second steering signal into a second controller, wherein the second steering signal comprises a target yaw rate;

outputting a second output signal from the second controller based on the first input signal;

incorporating the driver steering angle component and the second output signal into a first steering signal and inputting a first input signal that comprises the first steering signal into a first controller, wherein the first steering signal comprises a target steering angle; and outputting a first output signal used for control of a steering system from the first controller based on the first input signal.

13. The evaluation device according to claim 2, wherein the evaluation unit is further configured to communicate with at least a third control circuit comprising at least a third controller configured to receive a third input signal comprising a third steering signal as an input and to regulate a third control variable on the basis of the third steering signal, and wherein the second steering signal comprises a third output signal of the third controller, and wherein the at least one processor of the evaluation device is configured to:

determine, on the basis of the interference signal, at least one third model steering signal for the third controller; and output the at least one third model steering signal via the at least one output interface, wherein the at least one third model steering signal is incorporated in the third steering signal input into the third controller.

14. The evaluation device according to claim 2 for incorporating a manual steering torque of a driver of a vehicle to regulate a steering control system of the vehicle, wherein the first controller is configured to regulate a target steering angle, wherein the target steering angle is defined by the first steering signal, the second controller is configured to regulate a target yaw rate, wherein the target yaw rate is defined by the second steering signal, and the interference signal comprises the manual steering torque of the driver of the vehicle, wherein the evaluation device is configured to determine the first model steering signal such that the first model steering signal comprises a driver steering angle portion of the manual steering torque, and to determine the second model steering signal such that the second model steering signal comprises a driver yaw rate portion of the manual steering torque, in order to take into account the manual steering torque in the regulation of the steering control system as a steering signal.

15. The evaluation device according to claim 1, wherein the first model steering signal is incorporated with the second output signal of the second controller in the first steering signal as part of the first input signal input into the first controller by at least one of an addition or a subtraction, and the second model steering signal is incorporated in the second steering signal as part of the second input signal input into the second controller by at least one of an addition or a subtraction.

16. The method according to claim 10, wherein incorporating the driver yaw rate component into the second steering signal further comprises at least one of an addition or a subtraction, and incorporating the driver steering angle component and the second output signal into the first steering signal further comprises at least one of an addition or a subtraction.

17. The non-transitory computer readable medium according to claim 12, wherein incorporating the driver yaw rate component into the second steering signal further comprises at least one of an addition or a subtraction, and incorporating the driver steering angle component and the second output signal into the first steering signal further comprises at least one of an addition or a subtraction.

* * * * *